Jan. 3, 1956 W. E. POLK 2,729,022
MOVABLE TOY BIRD
Filed March 13, 1953
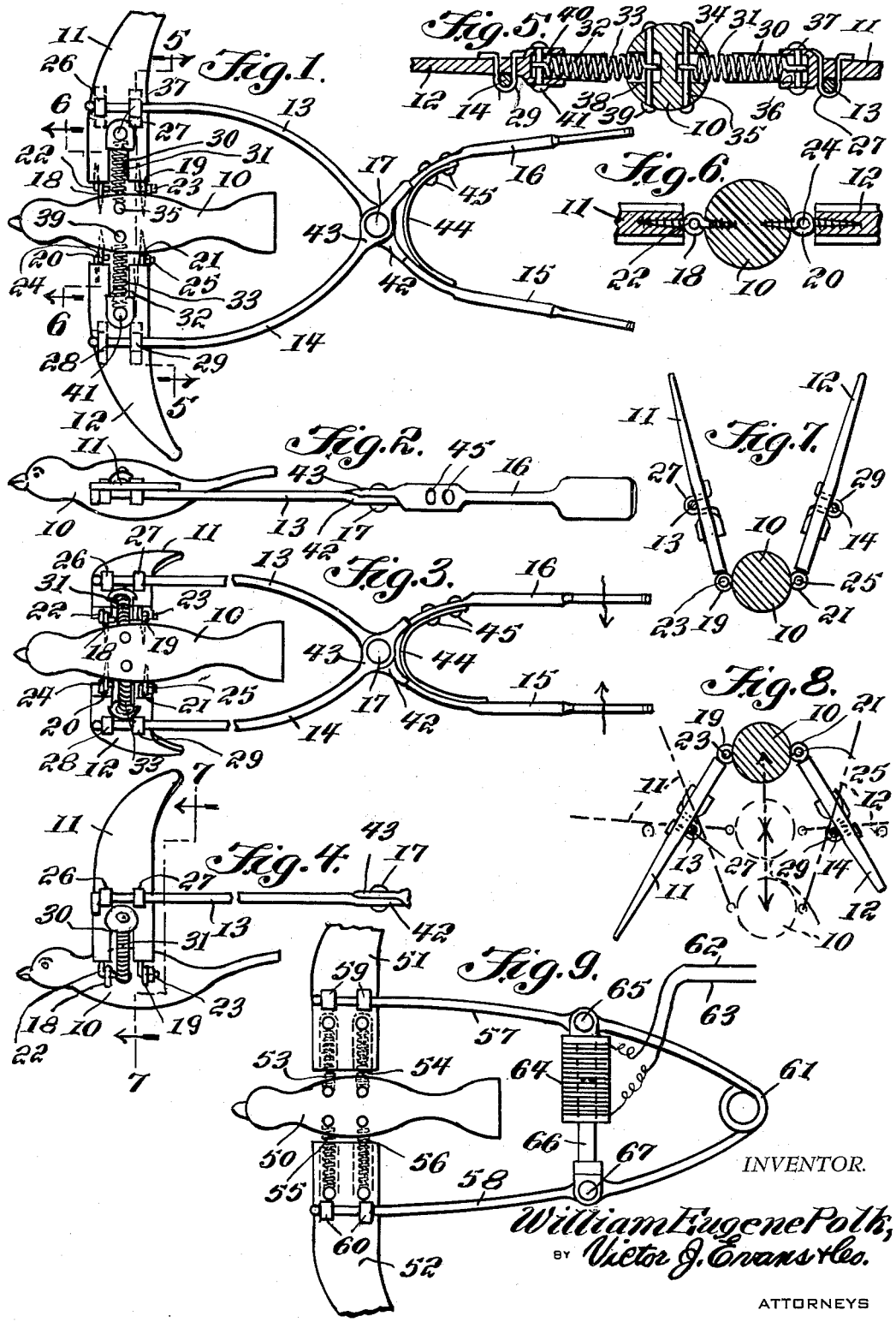
INVENTOR.
William Eugene Polk,
BY Victor J. Evans & Co.
ATTORNEYS

United States Patent Office 2,729,022
Patented Jan. 3, 1956

2,729,022

MOVABLE TOY BIRD

William Eugene Polk, New York, N. Y.

Application March 13, 1953, Serial No. 342,226

4 Claims. (Cl. 46—124)

This invention relates to an activated toy of the type wherein an animal is suspended by elastic elements between moving arms, and in particular a toy in which the animal is in the form of a bird and the body of the bird is suspended between wings hinged to the sides of the body and hinged on the ends of arms pivotally connected at a point spaced from the body and in which the arms are provided with handles, providing an operating mechanism similar to that of a pair of scissors.

The purpose of this invention is to provide an activated figure toy wherein the body of an animal suspended between spreading and contracting arms moves upwardly and downwardly to simulate the action of a bird in flight.

Various imitations have been provided of the original toy of this type wherein a monkey suspended by an elastic band between moving arms moves upwardly and downwardly and whereas such devices imparted action to toys of this type, the up and down action of a bird in flight required a more controlled movement. With this thought in mind this invention contemplates a toy in which spring actuated wings are pivotally connected to the sides of the body of a bird and the action of the wings is controlled by arms hingedly connected to the wings and provided with pivotally connected handles.

The object of this invention is, therefore, to provide means for manually actuating wings of a toy bird whereby with the wings hingedly connected to the body of the bird and controlled by springs in the connections the body of the bird may be moved by the arms to provide a waving action simulating the movement of a bird in flight.

Another object of the invention is to provide an activated figure toy wherein the parts are positively connected during the operation thereof.

A further object of the invention is to provide an activated figure toy wherein a body is suspended by wings hingedly connected to arms which are pivotally connected and provided with handles, in which the device is of a simple and economical construction.

With these and other objects and advantages in view the invention embodies a pair of pivotally connected arcuate arms having handles extended from the side of the pivotal connection opposite to that from which the arms extend, wings hinged to the extended ends of the arms, a body of a bird positioned between the arms and hingedly connected to the wings and springs connecting the body of the bird to the wings across the pivotal connections of the wings with the body for urging the ends of the arms to which the wings are connected from the center.

Other features and advantages of the invention will appear from the following description taken in connection with the drawing, wherein:

Figure 1 is a plan view of the improved toy with a tip of one of the wings broken away.

Figure 2 is a side elevational view of the toy with the parts shown in the free position.

Figure 3 is a plan view similar to that shown in Fig. 1 showing the device with the ends of the arms contracted.

Figure 4 is a side elevational view with the ends of the handles broken away and showing the device with the parts in the position as shown in Fig. 3.

Figure 5 is a longitudinal section through the intermediate part of the device taken on line 5—5 of Fig. 1 and showing the mounting of the springs in the body of the figure and also in the associated parts of the wings thereof.

Figure 6 is a similar section taken on line 6—6 of Fig. 1 illustrating the mounting of the wings on the body.

Figure 7 is a cross section through the device taken on line 7—7 of Fig. 4 showing the positions of the wings with the arms contracted.

Figure 8 is a section similar to that shown in Fig. 7 with the body of the figure extended upwardly above the arms.

Figure 9 is a plan view of the device, similar to that shown in Fig. 1 illustrating a modification wherein the wings are connected to the body of the figure with pairs of springs and wherein the arms are actuated by a solenoid.

Referring now to the drawing wherein like reference characters denote corresponding parts the improved activated figure toy of this invention includes a body 10 representing a bird, wings 11 and 12 extended from opposite sides of the body, arms 13 and 14 on the ends of which the wings are mounted and handles 15 and 16 extended from the arms and positioned on the opposite side of a pin 17 with which the arms 13 and 14 are pivotally connected.

As illustrated in Figs. 1 and 6 the body 10 is provided with eyes 18 and 19 on one side and 20 and 21 on the other and hooks 22 and 23 on one side and 24 and 25 on the other are pivotally mounted in the eyes whereby with the hooks secured in the wings the wings are hingedly connected to the body.

The wing 11 is provided with bearings 26 and 27 through which the extended end of the arm 13 is positioned and the wing 12 is provided with similar bearings 28 and 29 through which the end of the arm 14 extends.

The inner end of the wing 11 is provided with a slot 30 in which a spring 31 is positioned and the wing 12 is provided with a similar slot 32 in which a spring 33 is positioned. As illustrated in Fig. 5 the end of the spring 31 extends into a socket 34 in the body 10 and the end of the spring is secured by a pin 35 to the body. The opposite end of the spring 31 extends into a socket 36 in the wing 11 and the end of the spring is secured in the socket by a pin 37. By the same means the spring 33 is positioned with one end secured in a socket 38 of the body 10 by a pin 39 and the opposite end is secured in a socket 40 of the wing 12 with a pin 41.

The arms 13 and 14 are provided with flat sections 42 and 43, respectively through which the pin 17 extends and the handles 15 and 16, which extend from said flat sections are resiliently held in extended positions with a spring 44 which is secured to the inner surface of the handle 16 by rivets 45 and which is positioned to bear against the inner surface of the handle 15.

With the parts assembled in this manner it will be noted that upon pressing the handles 15 and 16 together the arms 13 and 14 move inwardly toward the positions shown in Fig. 3 whereby the wings may be extended upwardly or downwardly as illustrated in Figs. 7 and 8 and upon release of the handles the springs 31 and 33 urge the return of the parts to the extended positions, as illustrated in Fig. 1.

In the modification illustrated in Fig. 9 a body 50 with wings 51 and 52 extended therefrom is suspended between the wings with springs 53 and 54 at one side and 55 and 56 at the other whereby with the ends of the springs secured in the sockets of the body and wings, respectively, the wings are urged outwardly away from the body thereby urging the ends of arms 57 and 58 pivotally connected to the wings with bearings 59 and 60, respectively, outwardly to the positions shown in Figure 9.

The arms are pivotally connected by a pin 61 and as current is supplied by wires 62 and 63 to a solenoid 64 pivotally connected by a pin 65, to the arm 57 a core 66, pivotally connected to the arm 58 by a pin 67 is drawn inwardly contracting the extended ends of the arms 57 and 58 providing an activated action similar to that of the design shown in Figs. 1 to 8.

By this means the device may be operated from a remote point and may be mounted on a Christmas tree or suspended in a display window whereby with current intermittently supplied to the solenoid the arms will be contracted and spread, being spread by the springs as the circuit is broken.

With the parts assembled in this manner the arms are manually drawn inwardly toward the body and the compression springs urge the arms apart and the wings to straight or extended positions.

It will be understood that other modifications, within the scope of the appended claims, may be made in the design and arrangement of the parts without departing from the spirit of the invention.

What is claimed is:

1. An activated toy bird comprising a body, wings hinged to the sides of the body, springs positioned between the hinges also connecting the wings to the sides of the body, and pivotally connected arms positioned with ends thereof extended from one side of the pivotal connection hinged to the wings and with the ends on the opposite side of the pivotal connection extended to provide handles.

2. An activated toy bird comprising a pair of pivotally connected arms, a body of a toy bird positioned between the arms, wings hinged to the sides of the body and pivotally connected to the arms, springs extended between the wings and the body with one of the ends of the springs secured in sockets of the body and the opposite ends secured in sockets of the wings of the body, and handles on the ends of the arms extended beyond the pivotal connection thereof for actuating the arms.

3. In an activated toy bird, the combination which comprises a pair of arcuate arms, means pivotally connecting the arms, said arms having handles extended from said pivotal connection, a body positioned between the arms, wings hinged to the ends of the arms and extended from opposite sides of the body, means hingedly connecting the inner ends of the wings to the body, said body and wings having sockets therein, and springs also connecting the wings to the body with ends of the springs secured in the sockets of the body and wings.

4. In an activated toy bird, the combination which comprises a pair of arcuate arms, means pivotally connecting the arms, said arms having handles extended from said pivotal connection, a body positioned between the arms, wings hinged to the ends of the arms and extended from opposite sides of the body, means hingedly connecting the inner ends of the wings to the body, said body and wings having sockets therein, springs also connecting the wings to the body with ends of the springs secured in the sockets of the body and wings, and resilient means secured to one of the handles urging the handles outwardly whereby the arms are urged to outwardly extended positions.

References Cited in the file of this patent

UNITED STATES PATENTS

| 1,652,775 | Funk et al. | Dec. 13, 1927 |

FOREIGN PATENTS

| 327,450 | Germany | Oct. 13, 1920 |